(12) United States Patent
Xing et al.

(10) Patent No.: US 10,691,618 B2
(45) Date of Patent: Jun. 23, 2020

(54) SECURE ENCLAVES FOR USE BY KERNEL MODE APPLICATIONS

(71) Applicant: INTEL CORPORATION, Santa Clara, CA (US)

(72) Inventors: Bin Cedric Xing, Hillsboro, OR (US); Reshma Lal, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 639 days.

(21) Appl. No.: 14/369,252

(22) PCT Filed: Dec. 17, 2013

(86) PCT No.: PCT/US2013/075598
§ 371 (c)(1),
(2) Date: Jun. 27, 2014

(87) PCT Pub. No.: WO2015/094176
PCT Pub. Date: Jun. 25, 2015

(65) Prior Publication Data
US 2016/0283404 A1   Sep. 29, 2016

(51) Int. Cl.
*G06F 21/00* (2013.01)
*H04L 29/06* (2006.01)
(Continued)

(52) U.S. Cl.
CPC ........ *G06F 12/1408* (2013.01); *G06F 3/0622* (2013.01); *G06F 3/0632* (2013.01);
(Continued)

(58) Field of Classification Search
CPC ............ G06F 12/1408; G06F 12/0802; G06F 3/0632; G06F 9/4411; G06F 3/0622;
(Continued)

(56) References Cited

U.S. PATENT DOCUMENTS

2002/0169979 A1\* 11/2002 Zimmer ................ G06F 9/4401
726/1
2003/0101322 A1\* 5/2003 Gardner .............. G06F 12/1491
711/163
(Continued)

FOREIGN PATENT DOCUMENTS

WO     2011078855      6/2011
WO     WO-2018106744 A1 \*  6/2018  ........... H04L 9/3234

OTHER PUBLICATIONS

Muhammad E. S. Elrabaa ; Mohammed Al-Asli ; Marwan Abu-Amara; "Secure Computing Enclaves using FPGAs"; IEEE Transactions on Dependable and Secure Computing; Year: May 2019; Publisher: IEEE; pp. 1-20 (Year: 2019).\*
(Continued)

*Primary Examiner* — Shewaye Gelagay
*Assistant Examiner* — Courtney D Fields

(57) ABSTRACT

Various embodiments are generally directed to techniques to load and run secure enclaves for use by kernel mode applications. An apparatus to provide kernel mode access to a secure enclave includes a kernel mode secure enclave driver to provide user mode support for a kernel mode application and to initialize a secure enclave on behalf of the kernel mode application and a user mode secure enclave manager to process an instruction from the kernel mode application to the secure enclave.

23 Claims, 7 Drawing Sheets

(51) Int. Cl.
| | |
|---|---|
| *G06F 12/14* | (2006.01) |
| *G06F 21/62* | (2013.01) |
| *G06F 21/53* | (2013.01) |
| *G06F 21/57* | (2013.01) |
| *G06F 3/06* | (2006.01) |
| *G06F 9/4401* | (2018.01) |
| *G06F 12/0802* | (2016.01) |
| *G06F 12/1009* | (2016.01) |
| *H04L 9/32* | (2006.01) |
| *H04L 9/08* | (2006.01) |

(52) U.S. Cl.
CPC .......... *G06F 3/0673* (2013.01); *G06F 9/4406* (2013.01); *G06F 9/4411* (2013.01); *G06F 12/0802* (2013.01); *G06F 12/1009* (2013.01); *G06F 12/1466* (2013.01); *G06F 21/53* (2013.01); *G06F 21/575* (2013.01); *G06F 21/6218* (2013.01); *G06F 2212/1052* (2013.01); *G06F 2212/60* (2013.01)

(58) Field of Classification Search
CPC ............... G06F 12/1009; G06F 3/0673; G06F 12/1466; G06F 9/4406; G06F 21/6218; G06F 21/53; G06F 2212/60; G06F 2212/1052

See application file for complete search history.

(56) References Cited

U.S. PATENT DOCUMENTS

| | | | |
|---|---|---|---|
| 2011/0314468 A1* | 12/2011 | Zhou | G06F 9/45558 718/1 |
| 2012/0159184 A1* | 6/2012 | Johnson | G06F 12/1466 713/189 |
| 2013/0159726 A1* | 6/2013 | McKeen | G06F 21/72 713/189 |

OTHER PUBLICATIONS

Extended European Search Report received for European Patent Application No. 13899464.5, dated Jun. 19, 2017, 9 pages.
Hoekstra et al., "Using innovative instructions to create trustworthy software solutions", HASP (2013), 8 pages.
Azab et al., "SICE: A Hardware-Level Strongly Isolated Computing Environment for X86 Multi-core Programs", Computer and Communications Security, (2011), 14 pages.

* cited by examiner

SECURE ENCLAVES FOR USE BY KERNEL MODE APPLICATIONS

TECHNICAL FIELD

Embodiments described herein generally relate to secure enclaves and accessing secure enclaves from kernel mode applications.

BACKGROUND

A secure enclave is a memory aperture through which an application may process confidential information. For example, some secure enclaves are memory locations within a special range of physical memory in a computer system. The memory is encrypted under an ephemeral key created by a processor of the computer system at every power-on. As such, the memory is not accessible to any hardware devices in the computer system except the processor itself.

Secure enclaves may be used to process confidential information in memory locations that are not accessible by any other component and/or process of the computer system. For example, confidential information may be encrypted within a secure enclave. The encrypted information may only be decrypted within the secure enclave used to encrypt the confidential information. As such, data may be encrypted and decrypted without exposing the keys used to encrypt and/or decrypt the data. Accordingly, applications may interact with secure enclaves by calling the secure enclave using a variety of functions and passing any necessary data to the secure enclave. Due to the nature of the secure enclave and its use of specially encrypted memory locations, interaction with secure enclaves is limited to applications operating in user mode. Applications operating in kernel mode are prevented from interacting with secure enclaves.

As will be appreciated, applications responsible for initializing a computer system operate in kernel mode. For example, basic input/output system ("BIOS") and unified extensible firmware interface ("UEFI") are applications (or collections of applications) that initialize the various platform devices (especially storage devices where an operating system resides) necessary to start up a computer system. These applications operate in kernel mode and may be referred to as performing "pre-boot" operations for a computer system. There are instances where it is desirable to process confidential information in a secure enclave during pre-boot. For example, anti-theft technologies and full disk encryption technologies utilize a key (e.g., to unlock the computing device, decrypt the disk, or the like). The key is typically encrypted using a passphrase chosen by the user. During pre-boot, the user supplies the passphrase and the key is decrypted into plaintext in memory. However, as the memory is not protected, the key may be accessible by another application.

Thus, there is a need to access secure enclaves by a kernel mode application, particularly during pre-boot, to provide for secure processing of confidential information by the applications operating in kernel mode.

DETAILED DESCRIPTION

Figure 1:
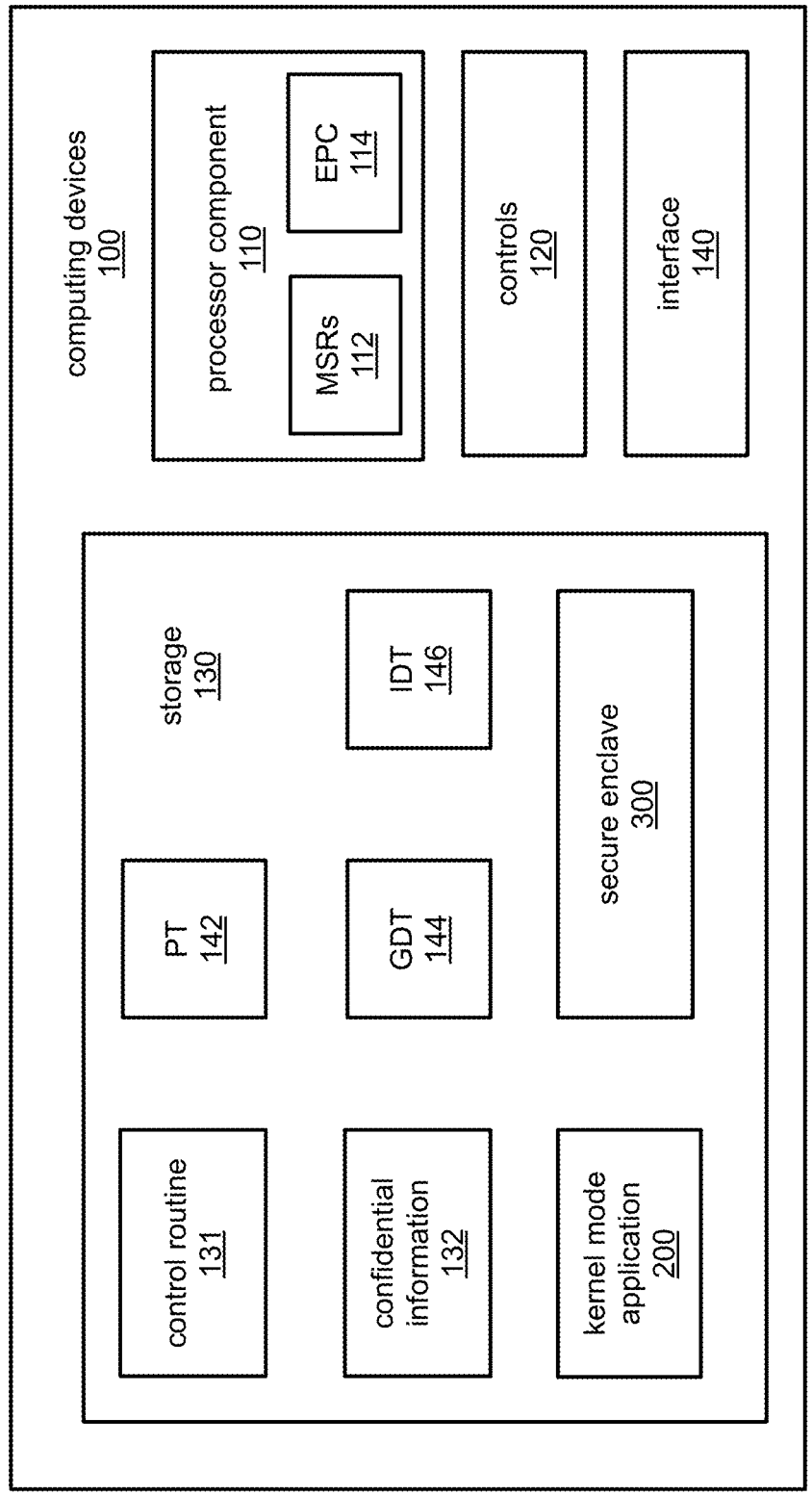
FIG. 1 illustrates an embodiment of a system for enabling access to a secure enclave by a kernel mode application.

With general reference to notations and nomenclature used herein, portions of the detailed description that follow may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include general purpose digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a general purpose computer. The required structure for a variety of these machines will be apparent from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

FIG. 1 is a block diagram of a system 1000 for enabling access to a secure enclave by a kernel mode application. The system 1000 incorporates a computing device 100. The computing device 100 may be any of a variety of types of computing devices, including without limitation, a desktop computer system, a data entry terminal, a laptop computer, a netbook computer, a tablet computer, a handheld personal data assistant, a smartphone, a digital camera, a body-worn computing device incorporated into clothing or wearable accessories (e.g., glasses, a watch, etc.,) a computing device integrated into a vehicle (e.g., a car, a bicycle, a wheelchair, etc.), a server, a cluster of servers, a server farm, a station, a wireless station, user equipment, and so forth. Embodiments are not limited in this context.

In general, the system 1000 is configured to allow a kernel model application to interact with a secure enclave. Said differently, the system 1000 is configured to allow loading and running secure enclaves by applications operating in kernel mode. It should be noted that although a single computing device (e.g., the computing device 100) is described for loading and running secure enclaves for use by a kernel mode application, the features of the computing device may be incorporated into multiple computing devices.

As will be appreciated, many modern processing components (e.g., x86, or the like) provide different modes of operation, referred to as "kernel mode" and "user mode." The processing component switches between these two modes depending on what privileges the particular application for which the processing component is executing instructions has. In general, applications used to initialize and provide interface functionality to components of the computing device (e.g., drivers, operating system components, pre-boot applications, or the like) have kernel mode privileges and therefore operate in kernel mode. Said differently, the processing component operates in kernel mode when executing instructions from these types of applications. Conversely, most other applications have user mode privileges. As such, the processing component operates in user mode when executing instructions from these types of applications.

Accordingly, various embodiments of the present disclosure provide for kernel mode applications that may load and run a secure enclave. For example, an application performing "pre-boot" operations (e.g., BIOS, UEFI, or the like), which typically operates in kernel mode, may load and run secure enclaves. In specific examples, anti-theft and/or full disk encryption technologies, which perform security sensitive processing while a computer system is initializing, may use secure enclaves for processing secure information (e.g., verification passphrase, decrypt necessary boot drivers, or the like.)

In various embodiments, the computing device 100 incorporates one or more of a processor component 110, controls 120, storage component 130, and an interface 140 to couple the computing device 100 to a network. The processor component may include one or more model specific registers 112 (MSRs) and a secure enclave page cache 114 (EPC). In some examples, the EPC 114 may be stored in a memory cache location on the processor 110. In other examples, the EPC 114 may be stored in another memory location (e.g., local memory, or the like.) In a particularly specific example, the EPC 114 may be stored in an cryptographically protected (e.g., MEE, or the like) region of the platform local memory (e.g., DRAM, or the like.) The storage component 130 stores one or more of a control routine 131, confidential information 132, a kernel mode application 200, a secure enclave 300, a page table 142 (PT), a global descriptor table 144 (GDT), and an interrupt descriptor table 146 (IDT).

In the computing device 100, the control routine 131 incorporates a sequence of instructions operative on the processor component 110 in its role as a main processor component to implement logic to perform various functions. In executing the control routine 131, the processor component 110 provides user mode support for a kernel mode application 200 so the kernel mode application 200 may interact with the secure enclave 300.

In executing the control routine 131, the processor component 110 may modify the GDT 142 and the IDT 144 to provide user mode privileges for the kernel mode application 200. Additionally, in executing the control routine 131, the processor component 110 may set one or more MSRs 112 to enable switching between user mode and kernel mode operation. For example, one or more MSRs 112 may be set to enable SYSCALL/SYSRET instructions, which as will be appreciated switches the processing component 110 between user mode and kernel mode.

Furthermore, in executing the control routine 131, the processor component 110 may add a number of memory pages to the EPC 114. Additionally, in executing the control routine 131, the processor component 110 may create the secure enclave 300. It is to be appreciated, that a variety of different techniques for creating and managing a secure enclave are available. The particular implementation may depend upon the type of processing component and/or the type of operating system. For example, Intel® Security Guard Extension® technology may be used to create the secure enclave 300 and process the confidential information 132 in the secure enclave 300. However, this is but one example, and embodiments are not limited in this regard.

In executing the control routine 131, the processor component 110 may additionally switch to user mode operation and process the confidential information 132 in the secure enclave 300 on behalf of the kernel mode application 200. In some examples, as stated, the kernel mode application 200 is a pre-boot application. Said differently, the kernel mode application may cause instructions to be executed by the processing component prior to an operating system being loaded. For example, the kernel mode application 200 may be an anti-theft application, a full-disk encryption application, or the like. In some examples, in executing the control routine 131, the processor component 110 may pass the secure enclave 300 to an operating system once the operating system is loaded.

In various examples, the PT 142, the GDT 144, the IDT 146 and the EPC 114 may be various data structures that define characteristics about the system 1000 and particularly the computing device 100. It is to be appreciated that a variety of different techniques for implementing data structures and specifically for implementing page tables, global descriptor tables, interrupt descriptor tables and enclave page caches are known. The particular implementation may depend upon the type of computing device 100, the type of processor 110, the type of storage component 130, and the software and/or operating system executing upon the computing device 100.

In various embodiments, the processor component 110 may include any of a wide variety of commercially available processor components such as, for example, central processing units, graphics processing units, or otherwise any processing unit. Further, one or more of these processor components may include multiple processors, a multi-threaded processor, a multi-core processor (whether the multiple cores coexist on the same or separate dies), and/or a multi-processor architecture of some other variety by which multiple physically separate processors are in some way linked.

In various embodiments, the storage component 130 may be based on any of a wide variety of information storage technologies, possibly including volatile technologies requiring the uninterrupted provision of electric power, and possibly including technologies entailing the use of machine-readable storage media that may or may not be removable. Thus, each of these storages may include any of a wide variety of types (or combination of types) of storage device, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). It should be noted that although each of these storages is depicted as a single block, one or more of these might include multiple storage devices that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages might be made up of multiple storage components based on identical storage technology, but which may be maintained separately as a result of specialization in use (e.g., some DRAM devices employed as a main storage while other DRAM devices employed as a distinct frame buffer of a graphics controller).

Although not depicted, the computing device 100 may exchange data conveying confidential information with other computing devices (not shown) through a network (not shown). Additionally, the computing device may exchange other data entirely unrelated to confidential information with other computing devices via the network. In various embodiments, the network may be a single network possibly limited to extending within a single building or other relatively limited area, a combination of connected networks possibly extending a considerable distance, and/or may include the Internet. Thus, the network may be based on any of a variety (or combination) of communications technologies by which signals may be exchanged, including without limitation, wired technologies employing electrically and/or optically conductive cabling, and wireless technologies employing infrared, radio frequency or other forms of wireless transmission.

In various embodiments, the interface 140 may employ any of a wide variety of signaling technologies enabling computing devices to be coupled to other devices as has been described. Each of these interfaces may include circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ signaling and/or protocols conforming to any of a variety of industry standards, including without limitation, RS-232C, RS-422, USB, Ethernet (IEEE-802.3) or IEEE-1394. Where the use of wireless signal transmission is entailed, these interfaces may employ signaling and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4G LTE, etc.

Figure 2:
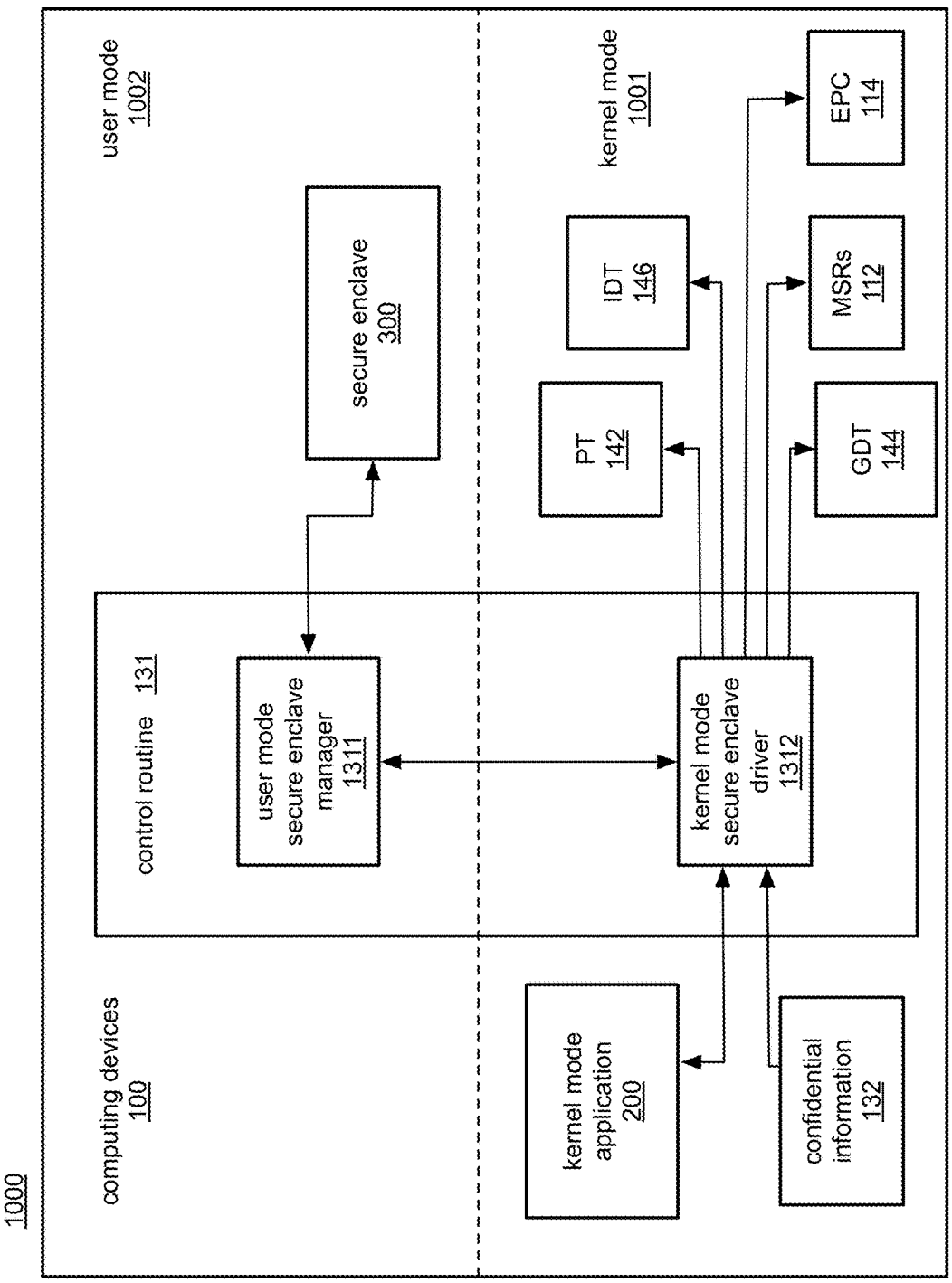
FIG. 2 illustrates a portion of an embodiment of the system for enabling access to a secure enclave by a kernel mode application.

FIG. 2 is a simplified block diagram of portions of an embodiment of the computing system 1000 of FIG. 1 including the control routine 131. In particular, FIG. 2 depicts aspects of accessing secure enclaves from kernel mode applications. Furthermore, FIG. 2 depicts those operations occurring in kernel mode 1101 and those operations occurring in user mode 1102.

In various embodiments, the control routine 131 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for the computing device 100 and/or the processor component 110. Where one or more device drivers are included, those device drivers may provide support for any of a variety of other components, whether hardware or software components of the computing device 100.

Turning more specifically to FIG. 2, the control routine includes a kernel mode secure enclave driver 1311 and a user mode secure enclave manager 1312. The kernel model secure enclave driver 1312 may modify a page table entry to allow user mode access for the kernel mode application. In some examples, the kernel mode secure enclave driver 1312 may modify an entry in the PT 142. For example, those pages containing user mode code may be configured as user pages in their respective entries in the PT 142. In some examples, the User/Supervisor bit of every entry in the PT 142 may be set to 1, indicating the memory location corresponding to the entry is assessable to user mode applications.

The kernel mode secure enclave driver 1312 further positions a segment descriptor in the GDT 144 to enable the kernel mode application to switch between kernel mode and user mode. For example, a segment descriptor may be positioned within the GDT 144 to enable switching between user mode and kernel mode. For example, SYSCALL/SYSRET, SYSENTRY/SYSEXIT, INT/IRET, or other segment descriptors, depending on the implementation, may be positioned in the GDT 144.

The kernel mode secure enclave driver 1312 further may enable one or more MSRs 112. For example, SYSCALL/SYSRET instructions may require IA32_STAR and IA32_LSTAR MSRs to be set properly. The kernel mode secure enclave driver 1312 further may modify the IDT 146 to determine the memory addresses of one or more interrupt routines to capture an interrupt exception when the user mode secure enclave manager 1312 is running in user mode.

The kernel mode secure enclave driver 1311 further initializes the secure enclave 300 on the storage component 130. Said differently, the kernel mode secure enclave driver 1311 creates the secure enclave 300. For example, the kernel mode secure enclave driver 1311 may add at least one memory page from the storage component 130 to the EPC 114. In some examples, the kernel mode secure enclave driver 1311 may support creating multiple secure enclaves. With some examples, the kernel mode secure enclave driver 1311 may support creating a single secure enclave at a time, by for example, continuously allocating pages in the EPC 114, starting from one end of the EPC range.

The kernel mode secure enclave driver 1311 may further extend a secure enclave image into the location of the memory page associated with the secure enclave 300 (e.g., the one or more memory pages created in the EPC 114.)

The user mode secure enclave manager 1312 switches the operation of the processing component 110 between kernel mode 1101 and user mode 1102. For example, the user mode secure enclave manager 1312 may switch between modes by causing the processing component 110 to execute the segment descriptor in the GDT 144.

The user mode secure enclave manager 1312 further receives an instruction from the kernel mode application 200 and causes the secure enclave 300 to run, in order to process the instruction. Said differently, the user mode secure enclave manager receives an instruction from the kernel mode application, the instruction including processing confidential information in the secure enclave. The user mode secure enclave manager then runs the secure enclave to process the confidential information on behalf of the kernel mode application. In general, the user mode secure enclave manager 1312 receives an instruction to "process" the confidential information 132 with the secure enclave 300.

For example, the kernel mode application 200 may be an anti-theft application that prompts a user's passphrase to verify the users identify. The instruction could be to verify the confidential information 132 (e.g., received passphrase, or the like) inside the secure enclave 300.

In some examples, the kernel mode application 200 may be a full disk encryption application that prompts a user's passphrase to decrypt the disk, including the component necessary to continue booting and loading the operating system. The instruction could be to decrypt the confidential information 132 (e.g., encrypted memory block storing an operating system loader, an operating system kernel, and/or an operating system boot driver, or the like) using the received passphrase inside the secure enclave 300.

It is to be appreciated, that the process for passing the confidential information 132 to the secure enclave 300 and causing the secure enclave 300 to process the confidential information 132 may vary depending upon the implementation.

The user mode secure enclave manager 1312 further provides an indication of the processing of the confidential information 132 in the secure enclave 300 to the kernel mode application 200. For example, the user mode secure enclave manager 1312 may provide an indication to the kernel mode application 200 that the verification of the passphrase was successful. In some examples, the user mode secure enclave manager 1312 may provide the decrypted memory block (or a location of the decrypted memory block) to the kernel mode application 200.

The kernel mode secure enclave driver 1311 may further pass the secure enclave 300 to an operating system (not shown). As used herein, "passing" the secure enclave 300 to an operating system includes allowing the secure enclave 300 to remain (e.g., in the EPC 114) to be used by the operating system during runtime. For example, if the kernel mode application 200 is a full disk encryption application, the operating system may need the same secure enclave 300 to decrypt the disk during runtime. Accordingly, various embodiments provide that the secure enclave 300 may be passed to an operating system. In some examples, the kernel mode secure enclave driver 1311 may convey the EPC 114 to the operating system. Additionally, the kernel mode secure enclave driver 1311 may map the secure enclave 300 into the same virtual memory address for the operating system. In some examples, the EPC 114 may be conveyed to the operating system using ACPI tables, or the like. In some examples, the secure enclave 300 may be conveyed from the pre-boot environment to an runtime environment (e.g., operating system, or the like) using ACPI tables, UEFI variables, using a fixed memory address, or the like.

Figure 3:
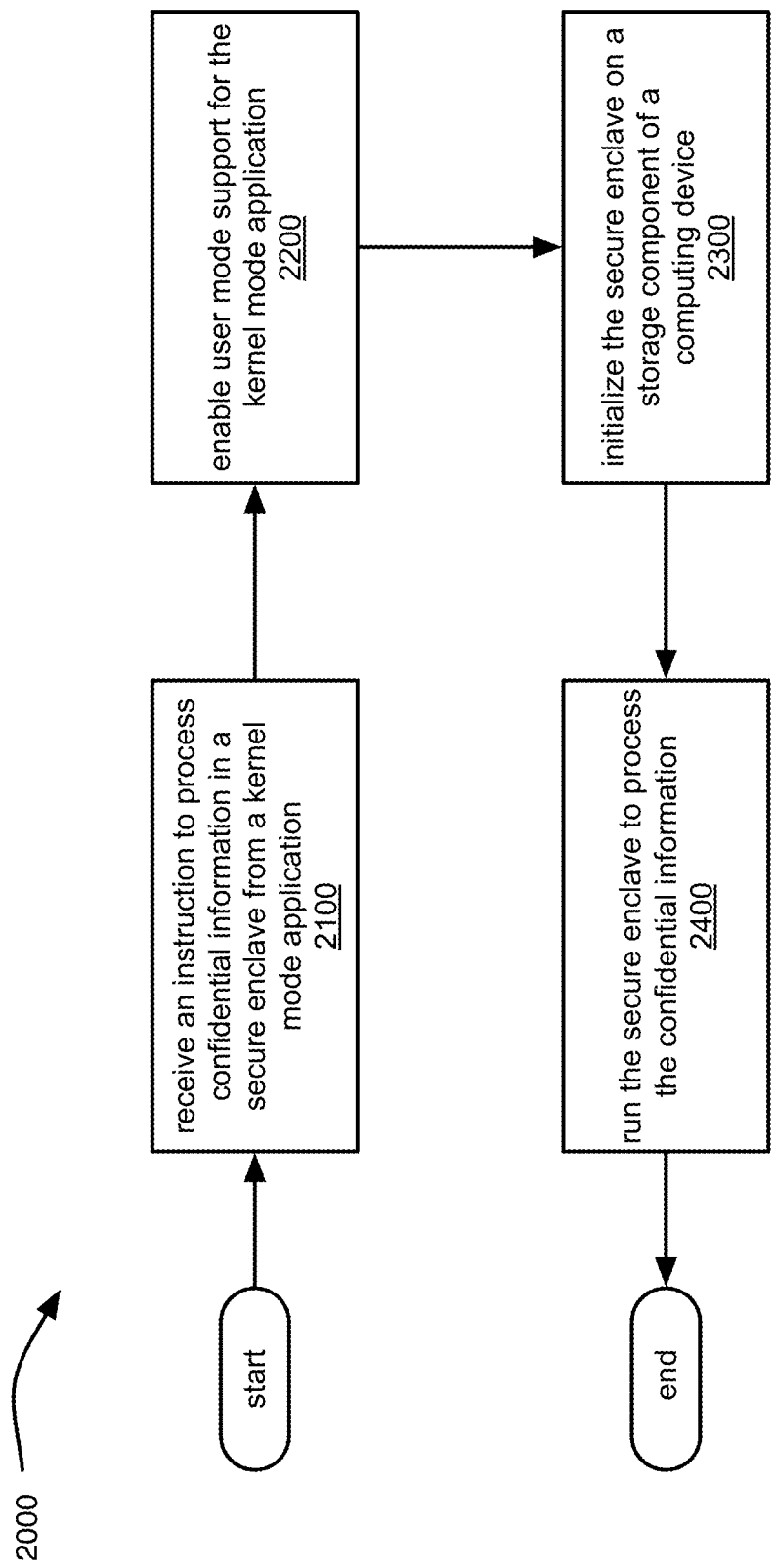
FIG. 3 illustrates a logic flow according to an embodiment.

FIG. 3 illustrates one embodiment of a logic flow 2000. The logic flow 2000 may be representative of some or all of the operations executed by one or more embodiments described herein. More specifically, the logic flow 2000 may illustrate operations performed by the processor component 110 in executing at least the control routine 131, and/or performed by other component(s) of the computing device 100.

At 2100, a processor component of a computing device of a system for enabling access to a secure enclave by a kernel mode application (e.g., the processor component 110 of the computing device 100 of the system 1000) is caused by execution of a kernel mode secure enclave driver of a control routine to receive an instruction to process in a secure enclave from a kernel mode application.

For example, the kernel mode secure enclave driver 1311 of the control routine 131 may receive an instruction from the kernel mode application 200 and transmit the instruction to the user mode secure enclave manager 1312. In some examples, the user mode secure enclave manager 1312 may receive the instruction from the kernel mode application 200 directly.

At 2200, the processor component of the computing device of the system for enabling access to a secure enclave by a kernel mode application (e.g., the processor component 110 of the computing device 100 of the system 1000) is caused by execution of a kernel mode secure enclave driver of a control routine to enable user mode support for the kernel mode application.

For example, the kernel mode secure enclave driver 1311 of the control routine 131 may enable user mode support for the kernel mode application 200. In some examples, the kernel mode secure enclave driver may modify the PT 142, the GDT 144, the IDT 146, the MSRs 112 to enable user mode support for the kernel mode application 200.

At 2300, the processor component of the computing device of the system for enabling access to a secure enclave by a kernel mode application (e.g., the processor component 110 of the computing device 100 of the system 1000) is caused by execution of a kernel mode secure enclave driver of a control routine to initialize the secure enclave.

For example, the kernel mode secure enclave driver 1311 of the control routine 131 may add one or more page entries to the EPC 114, create the secure enclave 300 in the memory location corresponding to the one or more page entries, and/or extend an image of a secure enclave in the memory location.

At 2400, the processor component of the computing device of the system for enabling access to a secure enclave by a kernel mode application (e.g., the processor component 110 of the computing device 100 of the system 1000) is caused by execution of a kernel mode secure enclave driver of a control routine to run the secure enclave to process the confidential information.

For example the user mode secure enclave manager 1312 may cause the secure enclave to process the confidential information 132. In some examples, the user mode secure enclave manager 1312 may call the secure enclave 300 using appropriate function calls for the secure enclave.

Figure 4:
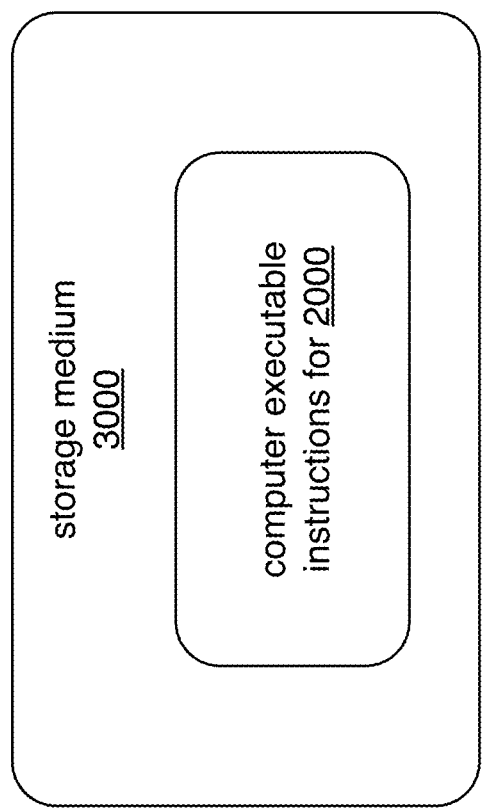
FIG. 4 illustrates an embodiment of a storage medium.

FIG. 4 illustrates an embodiment of a storage medium. As shown in FIG. 4, the storage medium includes a storage medium 3000. Storage medium 3000 may comprise an article of manufacture. In some examples, storage medium 3000 may include any non-transitory computer readable medium or machine readable medium, such as an optical, magnetic or semiconductor storage. Storage medium 3000 may store various types of computer executable instructions, such as instructions to implement logic flow 2000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 5:
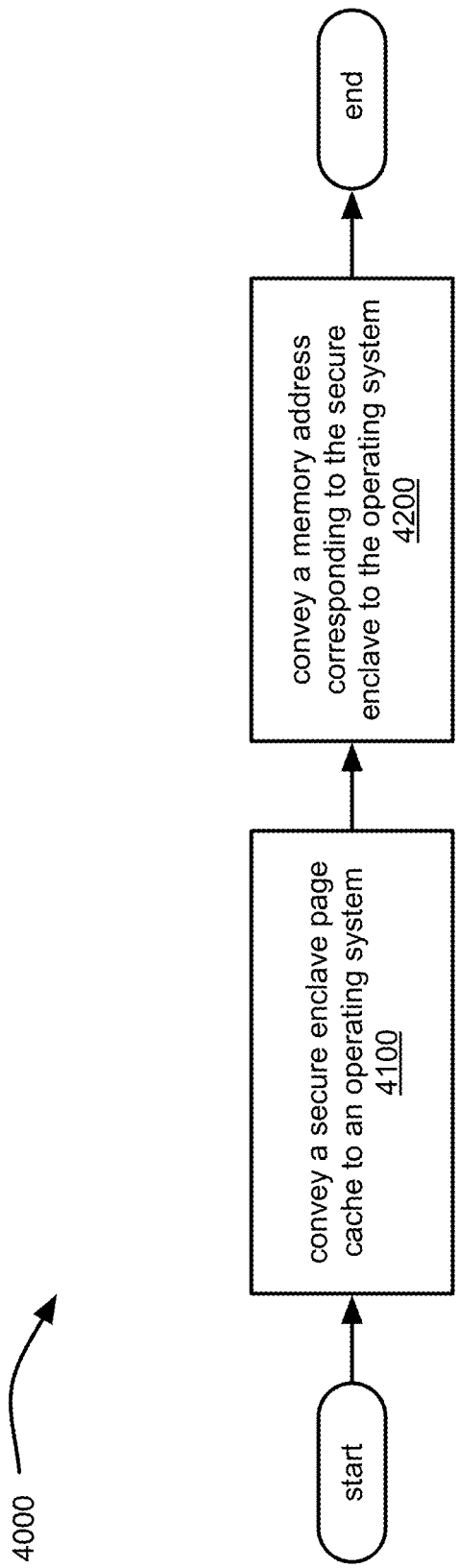
FIG. 5 illustrates a logic flow according to an embodiment.

FIG. 5 illustrates one embodiment of a logic flow 4000. The logic flow 4000 may be representative of some or all of the operations executed by one or more embodiments described herein. More specifically, the logic flow 4000 may illustrate operations performed by the processor component 110 in executing at least the control routine 131, and/or performed by other component(s) of the computing device 100.

At 4100, a processor component of a computing device of a system for enabling access to a secure enclave by a kernel mode application (e.g., the processor component 110 of the computing device 100 of the system 1000) is caused by execution of a kernel mode secure enclave driver of a control routine to convey a secure enclave page cache usage to an operating system. For example, the kernel mode secure enclave driver 1311 may convey the EPC 114 usage to an operating system. Said differently, the kernel mode secure enclave driver 1311 may convey the usage of the EPC 114 to an operating system so the operating system may allocate one or more additional memory pages from the storage component 130 while leaving intact the secure enclave 300.

At 4200, a processor component of a computing device of a system for enabling access to a secure enclave by a kernel mode application (e.g., the processor component 110 of the computing device 100 of the system 1000) is caused by execution of a kernel mode secure enclave driver of a control routine to convey a memory address corresponding to the secure enclave to the operating system so the operating system may map the secure enclave into a virtual memory location. For example, the kernel mode secure enclave driver 1311 may convey a virtual memory address corresponding to the secure enclave 300 to the operating system so the operating system may map the secure enclave 300 into the same virtual memory address (e.g., in the storage component 130, or the like).

Figure 6:
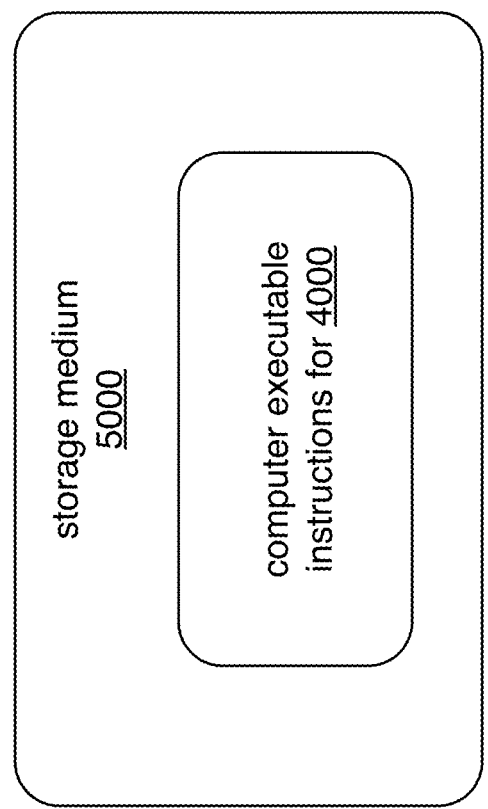
FIG. 6 illustrates an embodiment of a storage medium.

FIG. 6 illustrates an embodiment of a storage medium. As shown in FIG. 6, the storage medium includes a storage medium 5000. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flow 4000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 7:
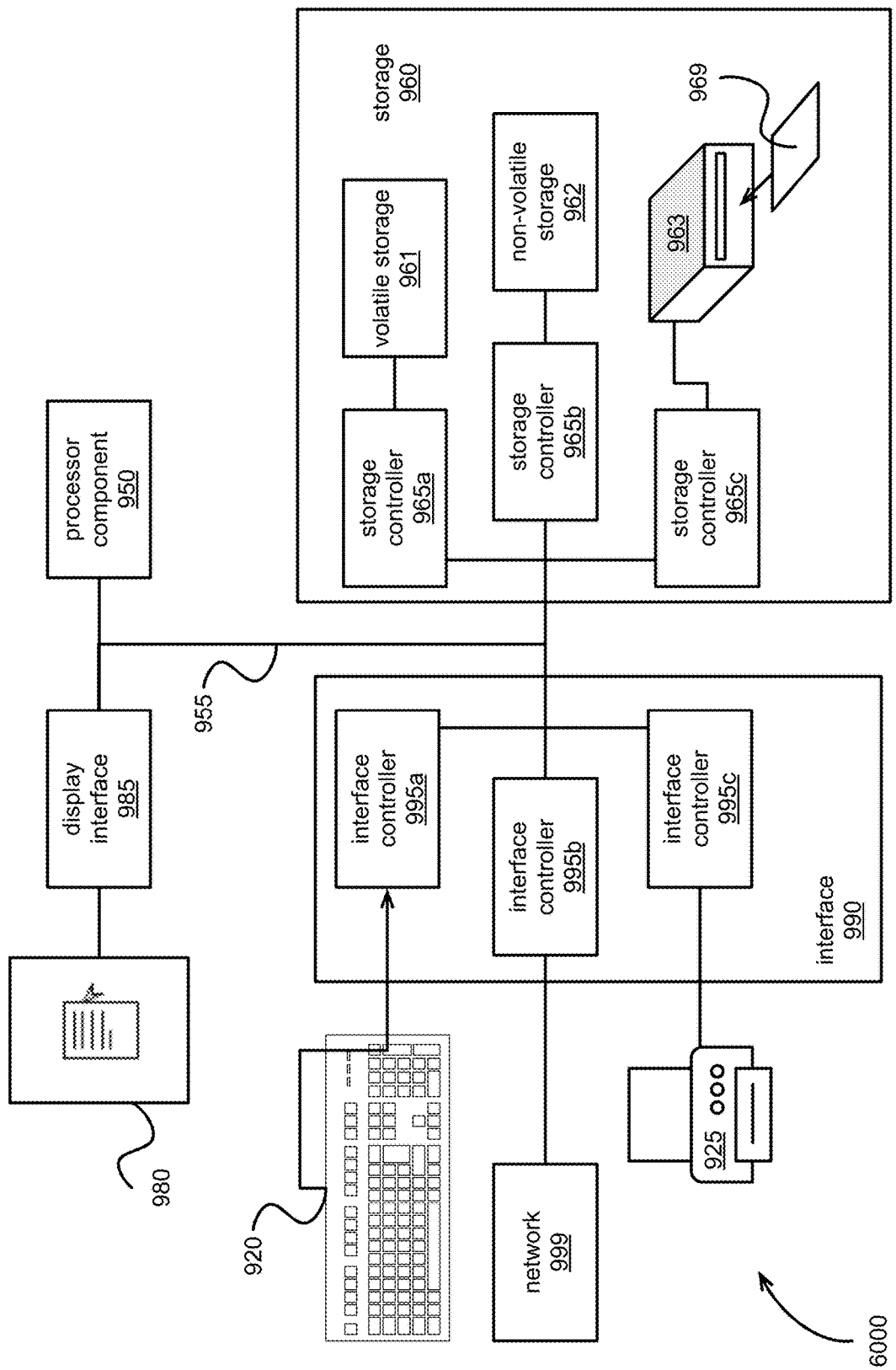
FIG. 7 illustrates a processing architecture according to an embodiment.

FIG. 7 illustrates an embodiment of an exemplary processing architecture 6000 suitable for implementing various embodiments as previously described. More specifically, the processing architecture 6000 (or variants thereof) may be implemented as part of the computing device 100.

The processing architecture 6000 may include various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage device (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to one or more signal lines. A message (including a command, status, address or data message) may be one of such signals or may be a plurality of such signals, and may be transmitted either serially or substantially in parallel through any of a variety of connections and/or interfaces.

As depicted, in implementing the processing architecture 3000, a computing device may include at least a processor component 950, a storage 960, an interface 990 to other devices, and a coupling 955. As will be explained, depending on various aspects of a computing device implementing the processing architecture 3000, including its intended use and/or conditions of use, such a computing device may further include additional components, such as without limitation, a display interface 985.

The coupling 955 may include one or more buses, point-to-point interconnects, transceivers, buffers, crosspoint switches, and/or other conductors and/or logic that communicatively couples at least the processor component 950 to the storage 960. Coupling 955 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 955 may be implemented with any of a variety of technologies or combinations of technologies by which signals are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (possibly corresponding to the processor component 110) may include any of a wide variety of commercially available processors, employing any of a wide variety of technologies and implemented with one or more cores physically combined in any of a number of ways.

As previously discussed, the storage 960 (possibly corresponding to the storage component 130) may be made up of one or more distinct storage devices based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as possibly including multiple distinct types of storage is in recognition of the commonplace use of more than one type of storage device in computing devices in which one type provides relatively rapid reading and writing capabilities enabling more rapid manipulation of data by the processor component 950 (but possibly using a "volatile" technology constantly requiring electric power) while another type provides relatively high density of non-volatile storage (but likely provides relatively slow reading and writing capabilities).

Given the often different characteristics of different storage devices employing different technologies, it is also commonplace for such different storage devices to be coupled to other portions of a computing device through different storage controllers coupled to their differing storage devices through different interfaces. By way of example, where the volatile storage 961 is present and is based on RAM technology, the volatile storage 961 may be communicatively coupled to coupling 955 through a storage controller 965a providing an appropriate interface to the volatile storage 961 that perhaps employs row and column addressing, and where the storage controller 965a may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 955 through a storage controller 965b providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 955 through a storage controller 965c providing an appropriate interface to the removable media storage 963 that perhaps employs addressing of blocks of information, and where the storage controller 965c may coordinate read, erase and write operations in a manner specific to extending the lifespan of the machine-readable storage medium 969.

One or the other of the volatile storage 961 or the non-volatile storage 962 may include an article of manufacture in the form of a machine-readable storage media on which a routine including a sequence of instructions executable by the processor component 950 to implement various embodiments may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage devices to store information, such as sequences of instructions, in a manner akin to a compact flash card. Again, it is commonplace to employ differing types of storage devices in a computing device at different times to store executable routines and/or data. Thus, a routine including a sequence of instructions to be executed by the processor component 950 to implement various embodiments may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (possibly corresponding to the interface 140) may employ any of a variety of signaling technologies corresponding to any of a variety of communications technologies that may be employed to communicatively couple a computing device to one or more other devices. Again, one or both of various forms of wired or wireless signaling may be employed to enable the processor component 950 to interact with input/output devices (e.g., the depicted example keyboard 920 or printer 925) and/or other computing devices, possibly through a network or an interconnected set of networks. In recognition of the often greatly different character of multiple types of signaling and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless signaling, timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel signal transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data signaled by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 140 and/or 240), such a computing device implementing the processing architecture 3000 may also include the display interface 985. Although more generalized types of interface may be employed in communicatively coupling to a display, the somewhat specialized additional processing often required in visually displaying various forms of content on a display, as well as the somewhat specialized nature of the cabling-based interfaces used, often makes the provision of a distinct display interface desirable. Wired and/or wireless signaling technologies that may be employed by the display interface 985 in a communicative coupling of the display 980 may make use of signaling and/or protocols that conform to any of a variety of industry standards, including without limitation, any of a variety of analog video interfaces, Digital Video Interface (DVI), DisplayPort, etc.

More generally, the various elements of the computing devices described and depicted herein may include various hardware elements, software elements, or a combination of both. Examples of hardware elements may include devices, logic devices, components, processors, microprocessors, circuits, processor components, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. The detailed disclosure now turns to providing examples that pertain to further embodiments. The examples provided below are not intended to be limiting.

EXAMPLE 1

An apparatus to provide kernel mode access to a secure enclave. The apparatus including a kernel mode secure enclave driver to provide user mode support for a kernel mode application, the kernel mode secure enclave driver to initialize a secure enclave on a storage component of a computing device on behalf of the kernel mode application, and a user mode secure enclave manager to process an instruction from the kernel mode application, the instruction including processing confidential information in the secure enclave.

EXAMPLE 2

The apparatus of example 1, the kernel mode secure enclave driver to modify a page table entry to allow user mode access for the kernel mode application to the secure enclave.

EXAMPLE 3

The apparatus of any of examples 1 to 2, the kernel mode secure enclave driver to position a segment descriptor in a global descriptor table to enable the kernel mode application to switch between kernel mode and user mode.

EXAMPLE 4

The apparatus of example 3, the kernel mode secure enclave driver to enable a model specific register to provide switching between kernel mode and user mode.

EXAMPLE 5

The apparatus of any of example 1 to 4, the kernel mode secure enclave driver to create the secure enclave.

EXAMPLE 6

The apparatus of example 5, the kernel mode secure enclave driver to add at least one memory page from the storage component to a secure enclave page cache, the at least one memory page corresponding to the secure enclave.

EXAMPLE 7

The apparatus of example 6, the kernel mode secure enclave driver to extend a secure enclave image into the at least one memory page.

EXAMPLE 8

The apparatus of any of examples 4 to 7, the user mode secure enclave manager to switch the kernel mode application between kernel mode and user mode privileges based at least in part on the segment descriptor in the global descriptor table and/or the model specific register.

EXAMPLE 9

The apparatus of any of examples 1 to 8, the user mode secure enclave manager to receive the instruction from the kernel mode application and cause the secure enclave to process the instruction.

EXAMPLE 10

The apparatus of any of examples 1 to 9, wherein the instruction is to verify a passphrase, the user mode secure enclave manager to transmit the passphrase to the secure enclave and instruct the secure enclave to verify the passphrase in the secure enclave.

EXAMPLE 11

The apparatus of example 10, the user mode secure enclave manager to receive an indication from the secure enclave corresponding to the verification of the passphrase.

EXAMPLE 12

The apparatus of examples 1 to 9, wherein the instruction is to decrypt an encrypted memory block, the user mode secure enclave manager to transmit the encrypted memory block to the secure enclave and instruct the secure enclave to decrypt the encrypted memory block in the secure enclave.

EXAMPLE 13

The apparatus of example 12, the user mode secure enclave manger to receive the contents of the encrypted memory block from the secure enclave and transmit the contents to the kernel mode application.

EXAMPLE 14

The apparatus of any of examples 1 to 13, the kernel mode secure enclave driver to pass the secure enclave to an operating system.

EXAMPLE 15

The apparatus of example 6, the kernel mode secure enclave driver to convey the secure enclave page cache usage to an operating system, the operating system configured to allocate one or more additional memory pages from the storage component based at least in part on the secure enclave page cache usage, and convey a memory address corresponding to the secure enclave to the operating system, the operating system configured to map the secure enclave into a virtual memory location based at least in part on the memory address.

convey the secure enclave page cache usage to an operating system, the operating system configured to allocate one or more additional memory pages from the storage component for the secure enclave based at least in part on the secure enclave page cache usage, and map the secure enclave into a selected virtual memory location.

EXAMPLE 16

The apparatus of any of example 1 to 15, wherein the kernel mode application is either a full disk encryption application or an anti-theft application.

EXAMPLE 17.

The apparatus of example 13, wherein the kernel mode application is a full disk encryption application and the encrypted memory block includes the operating system loader, an operating system kernel, and/or an operating system boot driver.

EXAMPLE 18

The apparatus of example 11, wherein the kernel mode application is an anti-theft application and the passphrase corresponds to a user verification passphrase.

EXAMPLE 19

The apparatus of example 1, wherein the secure enclave is encrypted under an ephemeral key created by a processor component.

EXAMPLE 20

A computing system to allow access to a secure enclave by a kernel mode application. The computing system including a processing component, a computing system firmware interface for execution by the processing component, the computing system firmware interface to start a kernel mode application, the kernel mode application to initialize a portion of the computer system, a kernel mode secure enclave driver for execution by the processing component, the kernel mode secure enclave driver to provide user mode support for the kernel mode application and to initialize a secure enclave on a storage component on behalf of the kernel mode application, and a user mode secure enclave manager for execution by the processing component, the user mode secure enclave manager to process an instruction from the kernel mode application, the instruction including processing confidential information in the secure enclave.

EXAMPLE 21

The computing system of example 19, the kernel mode secure enclave driver to modify a page table entry to allow user mode access for the kernel mode application to the secure enclave.

EXAMPLE 22

The computing system of any of examples 19 to 20, the kernel mode secure enclave driver to position a segment descriptor in a global descriptor table to enable the kernel mode application to switch between kernel mode and user mode.

EXAMPLE 23

The computing system of example 21, the kernel mode secure enclave driver to enable a model specific register to provide switching between kernel mode and user mode.

EXAMPLE 24

The computing system of any of examples 19 to 22, the kernel mode secure enclave driver to create the secure enclave.

EXAMPLE 25

The computing system of example 23, the kernel mode secure enclave driver to add at least one memory page of the storage component to a secure enclave page cache, the at least one memory page corresponding to the secure enclave.

EXAMPLE 26

The computing system of example 24, the kernel mode secure enclave driver to extend a secure enclave image into the at least one memory page.

EXAMPLE 27

The computing system of any of examples 22 to 25, the user mode secure enclave manager to switch the kernel mode application between kernel mode and user mode privileges based at least in part on the segment descriptor in the global descriptor table and/or the model specific register.

EXAMPLE 28

The computing system of any of examples 19 to 26, the user mode secure enclave manager to receive the instruction from the kernel mode application and cause the secure enclave to process the instruction.

EXAMPLE 29

The computing system of any of examples 19 to 27, wherein the instruction is to verify a passphrase, the user mode secure enclave manager to transmit the passphrase to the secure enclave and instruct the secure enclave to verify the passphrase in the secure enclave.

EXAMPLE 30

The computing system of example 28, the user mode secure enclave manager to receive an indication from the secure enclave corresponding to the verification of the passphrase.

EXAMPLE 31

The computing system of examples 19 to 27, wherein the instruction is to decrypt an encrypted memory block, the user mode secure enclave manager to transmit the encrypted memory block to the secure enclave and instruct the secure enclave to decrypt the encrypted memory block in the secure enclave.

EXAMPLE 32

The computing system of example 30, the user mode secure enclave manger to receive the contents of the encrypted memory block from the secure enclave and transmit the contents to the kernel mode application.

EXAMPLE 33

The computing system of any of examples 19 to 31, the kernel mode secure enclave driver to pass the secure enclave to an operating system.

EXAMPLE 34

The computing system of example 24, the kernel mode secure enclave driver to convey the secure enclave page cache usage to an operating system, the operating system configured to allocate one or more additional memory pages from the storage component based at least in part on the secure enclave page cache usage, and convey a memory address corresponding to the secure enclave to the operating system, the operating system configured to map the secure enclave into a virtual memory location based at least in part on the memory address.

EXAMPLE 35

The computing system of any of example 19 to 33, wherein the kernel mode application is either a full disk encryption application or an anti-theft application.

EXAMPLE 36

The computing system of example 31, wherein the kernel mode application is a full disk encryption application and the encrypted memory block includes the operating system loader, an operating system kernel, and/or an operating system boot driver.

EXAMPLE 37

The computing system of example 29, wherein the kernel mode application is an anti-theft application and the passphrase corresponds to a user verification passphrase.

EXAMPLE 38

The computing system of example 20, wherein the secure enclave is encrypted under an ephemeral key created by the processor component.

EXAMPLE 39

A computing-implemented method for accessing a secure enclave with a kernel mode application. The method including receiving an instruction to process confidential information in a secure enclave from a kernel mode application, enabling user mode support for the kernel mode application, initializing the secure enclave on a storage component of a computing device, and running the secure enclave to process the confidential information.

EXAMPLE 40

The computing-implemented method of example 39, further comprising launching the kernel mode application.

EXAMPLE 41

The computing-implemented method of any of examples 39 or 40, enabling user mode support for the kernel mode application comprising modifying a page table entry to provide user mode support for the kernel mode application.

EXAMPLE 42

The computing-implemented method of any of examples 39 to 41, further comprising positioning a segment descriptor in a global descriptor table to switch between kernel mode and user mode.

EXAMPLE 43

The computing-implemented method of any of examples 39 to 42, initializing the secure enclave comprising allocating at least one memory page from the storage component for the secure enclave, and adding the at least one memory page to an enclave page cache corresponding to the secure enclave.

EXAMPLE 44

The computing-implemented method of example 43, further comprising creating the secure enclave in the at least one memory page.

EXAMPLE 45

The computing-implemented method of example 43, further comprising extending the contents of a secure enclave image into the at least one memory page.

EXAMPLE 46

The computing-implemented method of any of examples 39 to 45, wherein the instruction is to verify a passphrase, the method further comprising transmitting the passphrase to the secure enclave and instructing the secure enclave to verify the passphrase in the secure enclave.

EXAMPLE 47

The computing-implemented method of example 46, further comprising receiving an indication from the secure enclave corresponding to the verification of the passphrase.

EXAMPLE 48

The computing-implemented method of examples 39 to 45, wherein the instruction is to decrypt an encrypted memory block, the method further comprising transmitting the encrypted memory block to the secure enclave and instructing the secure enclave to decrypt the encrypted memory block in the secure enclave.

EXAMPLE 49

The computing-implemented method of example 48, further comprising receiving the contents of the encrypted memory block from the secure enclave and transmit the contents to the kernel mode application.

EXAMPLE 50

The computing-implemented method of any of examples 39 to 49, further comprising passing the secure enclave to an operating system.

EXAMPLE 51

The computing-implemented method of example 43, further comprising conveying the secure enclave page cache usage to an operating system, the operating system configured to allocate one or more additional memory pages from the storage component based at least in part on the secure enclave page cache usage, and conveying a memory address corresponding to the secure enclave to the operating system, the operating system configured to map the secure enclave into a virtual memory location based at least in part on the memory address.

EXAMPLE 52

The computing-implemented method of any of example 39 to 51, wherein the kernel mode application is either a full disk encryption application or an anti-theft application.

EXAMPLE 53

The computing-implemented method of example 49, wherein the kernel mode application is a full disk encryption application and the encrypted memory block includes the operating system loader, an operating system kernel, and/or an operating system boot driver.

EXAMPLE 54

The computing-implemented method of example 47, wherein the kernel mode application is an anti-theft application and the passphrase corresponds to a user verification passphrase.

EXAMPLE 55

An apparatus for accessing a secure enclave with a kernel mode application. The apparatus comprising means for receiving an instruction to process confidential information in a secure enclave from a kernel mode application, means for enabling user mode support for the kernel mode application, means for initializing the secure enclave on a storage component of a computing device, and means for running the secure enclave to process the confidential information.

EXAMPLE 56

The apparatus of example 55, further comprising means for launching the kernel mode application.

EXAMPLE 57

The apparatus of any of examples 55 or 56, the means for enabling user mode support for the kernel mode application comprising means for modifying a page table entry to provide user mode support for the kernel mode application.

EXAMPLE 58

The apparatus of any of examples 55 to 57, further comprising means for positioning a segment descriptor in a global descriptor table to switch between kernel mode and user mode.

EXAMPLE 59

The apparatus of any of examples 55 to 58, the means for initializing the secure enclave comprising means for allocating at least one memory page from the storage component for the secure enclave, and means for adding the at least one memory page to an enclave page cache corresponding to the secure enclave.

EXAMPLE 60

The apparatus of example 59, further comprising means for creating the secure enclave in the at least one memory page.

EXAMPLE 61

The apparatus of example 59, further comprising means for extending the contents of a secure enclave image into the at least one memory page.

EXAMPLE 62

The apparatus of any of examples 55 to 61, wherein the instruction is to verify a passphrase, the apparatus further comprising means for transmitting the passphrase to the secure enclave and instructing the secure enclave to verify the passphrase in the secure enclave.

EXAMPLE 63

The apparatus of example 62, further comprising means for receiving an indication from the secure enclave corresponding to the verification of the passphrase.

EXAMPLE 64

The apparatus of examples 55 to 61, wherein the instruction is to decrypt an encrypted memory block, the apparatus further comprising means for transmitting the encrypted memory block to the secure enclave and instructing the secure enclave to decrypt the encrypted memory block in the secure enclave.

EXAMPLE 65

The apparatus of example 64, further comprising means for receiving the contents of the encrypted memory block from the secure enclave and transmitting the contents to the kernel mode application.

EXAMPLE 66

The apparatus of any of examples 55 to 65, further comprising means for passing the secure enclave to an operating system.

EXAMPLE 67

The apparatus of example 59, further comprising means to convey the secure enclave page cache usage to an operating system, the operating system configured to allocate one or more additional memory pages from the storage component based at least in part on the secure enclave page cache usage, and means to convey a memory address corresponding to the secure enclave to the operating system, the operating system configured to map the secure enclave into a virtual memory location based at least in part on the memory address.

EXAMPLE 68

The apparatus of any of example 55 to 67, wherein the kernel mode application is either a full disk encryption application or an anti-theft application.

EXAMPLE 69

The apparatus of example 65, wherein the kernel mode application is a full disk encryption application and the encrypted memory block includes the operating system loader, an operating system kernel, and/or an operating system boot driver.

EXAMPLE 70

The apparatus of example 63, wherein the kernel mode application is an anti-theft application and the passphrase corresponds to a user verification passphrase.

EXAMPLE 71

At least one machine-readable storage medium comprising instructions that when executed by a computing device, cause the computing device to perform the method of any of examples 39-54.

The invention claimed is:
1. An apparatus to provide kernel mode access to a secure enclave comprising:
a processor; and
memory comprising instructions that when executed by the processor cause the processor to:
provide user mode support for a kernel mode application prior to an operating system being loaded on a computing device, initialize a secure enclave on a storage component of the computing device on behalf of the kernel mode application prior to the operating system being loaded, switch to a user mode prior to the operating system being loaded, process an instruction in the user mode from the kernel mode application prior to the operating system being loaded, the instruction to decrypt an encrypted memory block, and instruct the secure enclave to access the encrypted memory block and decrypt the encrypted memory block in the secure enclave.

2. The apparatus of claim 1, the memory comprising instructions that when executed by the processor cause the processor to modify a page table entry to allow user mode access for the kernel mode application to the secure enclave.

3. The apparatus of claim 2, the memory comprising instructions that when executed by the processor cause the processor to position a segment descriptor in a global descriptor table to enable the kernel mode application to switch between kernel mode and user mode.

4. The apparatus of claim 3, the memory comprising instructions that when executed by the processor cause the processor to enable a model specific register to provide switching between kernel mode and user mode.

5. The apparatus of claim 2, the memory comprising instructions that when executed by the processor cause the processor to create the secure enclave.

6. The apparatus of claim 5, the memory comprising instructions that when executed by the processor cause the processor to add at least one memory page from the storage component to a secure enclave page cache, the at least one memory page corresponding to the secure enclave.

7. The apparatus of claim 6, the memory comprising instructions that when executed by the processor cause the processor to extend a secure enclave image into the at least one memory page.

8. The apparatus of claim 1, the memory comprising instructions that when executed by the processor cause the processor to receive the instruction from the kernel mode application and cause the secure enclave to process the instruction.

9. The apparatus of claim 1, wherein the instruction is to verify a passphrase, the memory comprising instructions that when executed by the processor cause the processor to transmit the passphrase to the secure enclave and instruct the secure enclave to verify the passphrase in the secure enclave.

10. The apparatus of claim 1, the memory comprising instructions that when executed by the processor cause the processor to pass the secure enclave to the operating system once the operating system is loaded.

11. A computing-implemented method for accessing a secure enclave with a kernel mode application, the method comprising:

receiving an instruction to decrypt an encrypted memory block in a secure enclave from a kernel mode application prior to an operating system being loaded on a computing device;

enabling user mode support for the kernel mode application prior to the operating system being loaded;

initializing the secure enclave on a storage component of the computing device prior to the operating system being loaded;

switching to a user mode prior to the operating system being loaded; and running the secure enclave in the user mode to access the encrypted memory block and decrypt the encrypted memory block in the secure enclave prior to the operating system being loaded.

12. The computing-implemented method of claim 11, enabling user mode support for the kernel mode application comprising modifying a page table entry to provide user mode support for the kernel mode application.

13. The computing-implemented method of claim 12, further comprising positioning a segment descriptor in a global descriptor table to switch between kernel mode and user mode.

14. The computing-implemented method of claim 12, initializing the secure enclave comprising:

allocating at least one memory page from the storage component for the secure enclave; and adding the at least one memory page to an enclave page cache corresponding to the secure enclave.

15. The computing-implemented method of claim 14, further comprising extending contents of a secure enclave image into the at least one memory page.

16. The computing-implemented method of claim 11, wherein the instruction is to verify a passphrase, the method further comprising transmitting the passphrase to the secure enclave and instructing the secure enclave to verify the passphrase in the secure enclave.

17. The computing-implemented method of claim 11, further comprising passing the secure enclave to the operating system once the operating system is loaded.

18. The computing-implemented method of claim 17, further comprising:

conveying secure enclave page cache usage to the operating system once the operating system is loaded to enable the operating system to allocate one or more additional memory pages from the storage component for the secure enclave based at least in part on the secure enclave page cache usage; and mapping the secure enclave into a selected virtual memory location.

19. At least one non-transitory machine-readable storage medium comprising instructions that when executed by a computing device, cause the computing device to:

receive an instruction to decrypt an encrypted memory block in a secure enclave from a kernel mode application prior to an operating system being loaded on a computing device;

enable user mode support for the kernel mode application prior to the operating system being loaded;

initialize the secure enclave on a storage component of the computing device prior to the operating system being loaded;

switch to a user mode prior to the operating system being loaded; and run the secure enclave in the user mode to access the encrypted memory block and decrypt the encrypted memory block in the secure enclave prior to the operating system being loaded.

20. The at least one non-transitory machine-readable storage medium of claim 19, further comprising instructions that when executed cause the computing device to:

modify a page table entry to allow user mode support for the kernel mode application; and position a segment descriptor in a global descriptor table to switch between kernel mode and user mode.

21. The at least one non-transitory machine-readable storage medium of claim 20, further comprising instructions that when executed cause the computing device to:

allocating at least one memory page from the storage component for the secure enclave; and adding the at least one memory page to an enclave page cache corresponding to the secure enclave.

22. An apparatus for accessing a secure enclave with a kernel mode application, comprising:

means for receiving an instruction to decrypt an encrypted memory block in a secure enclave from a kernel mode application prior to an operating system being loaded on a computing device;

means for enabling user mode support for the kernel mode application prior to the operating system being loaded;

means for initializing the secure enclave on a storage component of the computing device prior to the operating system being loaded;

means for switching to a user mode prior to the operating system being loaded; and means for running the secure enclave in the user mode to access the encrypted memory block and decrypt the encrypted memory block in the secure enclave prior to the operating system being loaded.

23. The apparatus of claim 22, further comprising:

means to convey secure enclave page cache usage to the operating system once the operating system is loaded, the operating system configured to allocate one or more additional memory pages from the storage component based at least in part on the secure enclave page cache usage; and means to convey a memory address corresponding to the secure enclave to the operating system, the operating system configured to map the secure enclave into a virtual memory location based at least in part on the memory address.

* * * * *